May 4, 1943.　　　O. F. DRENNAN　　　2,318,205
PLANTING AND FERTILIZING MEANS
Filed Dec. 29, 1939　　　2 Sheets-Sheet 1
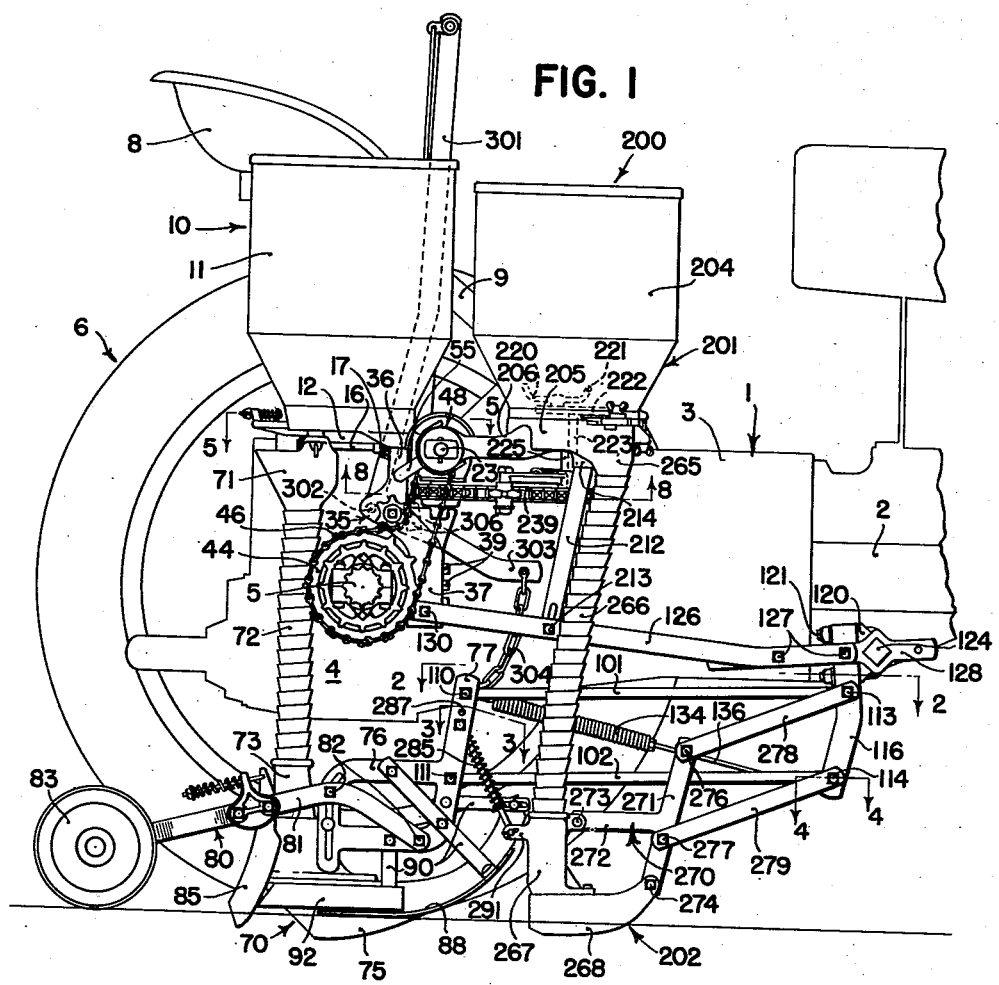
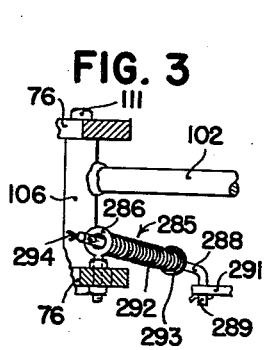
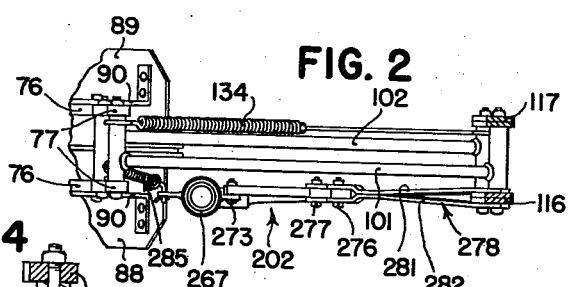
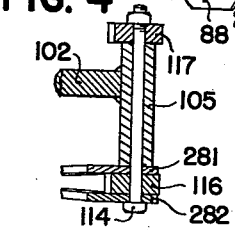
*INVENTOR:*
ORVILLE F. DRENNAN
BY *[signature]*
*ATTORNEYS.*

May 4, 1943.　　　　　O. F. DRENNAN　　　　　2,318,205
PLANTING AND FERTILIZING MEANS
Filed Dec. 29, 1939　　　　2 Sheets-Sheet 2
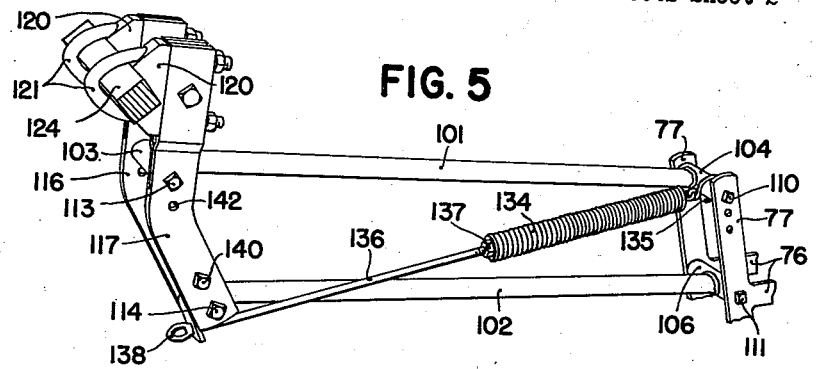
FIG. 5
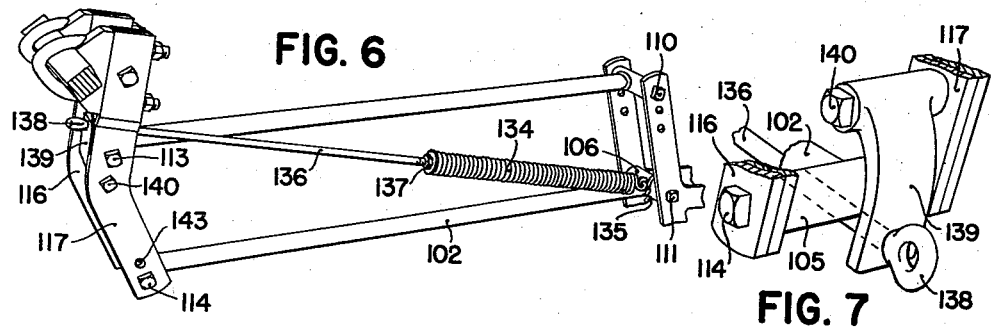
FIG. 6　　FIG. 7
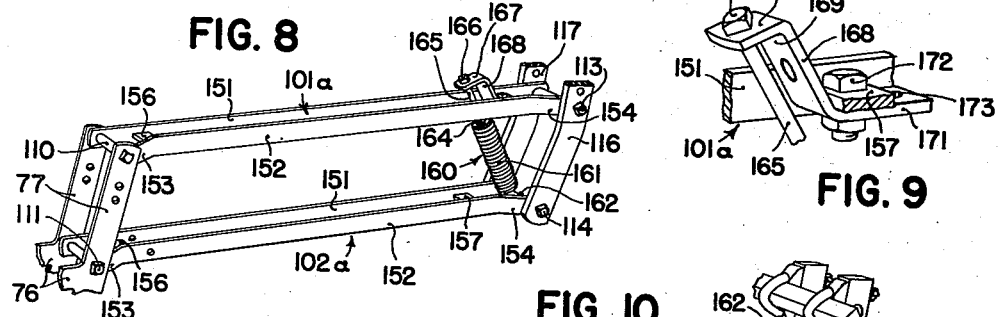
FIG. 8　　FIG. 9
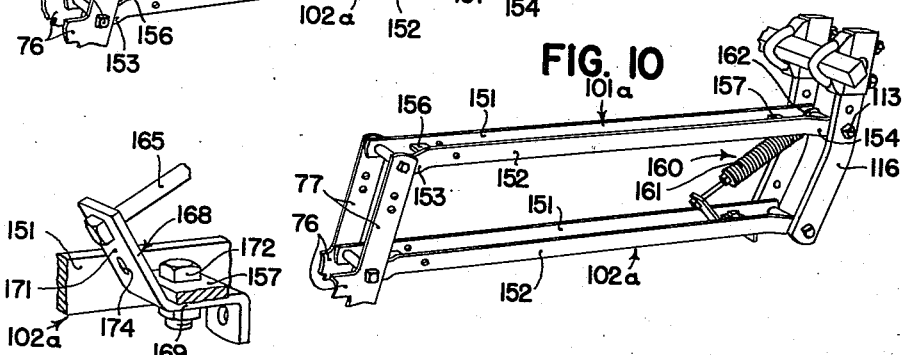
FIG. 10
FIG. 11
INVENTOR:
ORVILLE F. DRENNAN
BY
ATTORNEYS.

Patented May 4, 1943

2,318,205

UNITED STATES PATENT OFFICE 2,318,205

PLANTING AND FERTILIZING MEANS

Orville F. Drennan, Moline, Ill., assignor to Deere & Company, Moline, Ill., a corporation of Illinois.

Application December 29, 1939, Serial No. 311,586

28 Claims. (Cl. 111—62)

This invention relates generally to agricultural machines and more particular to planters adapted to be mounted on a tractor.

The object and general nature of this invention is the provision of certain new and useful improvements in agricultural implements, such as a planter or fertilizer distributor, and more particularly it is a feature of this invention to provide new and improved means for associating the planting and fertilizer units one with the other in operative relationship on the tractor. It is also a feature of this invention to provide means for propelling one of the furrow opening runners, with spring means associated therewith and adapted to be arranged optionally for increasing the downward pressure, or, as when the ground is soft, offsetting at least a part of the weight of the runner to prevent the latter from operating too deep.

A further feature of this invention is the provision of an improved fertilizer attachment for a tractor planter, and a more specific feature of this invention embodies a fertilizer furrow opener connected to be propelled by pull links, particularly in connection with spring means operatively connecting the fertilizer furrow opener with the planter furrow opener, said pull link means being constructed so as to permit relative movement of one furrow opener with respect to the other. It is also a feature of this invention to provide spring means interconnecting the planter and fertilizer furrow openers in such a way that the lifting means on the tractor raises both the planter and fertilizer furrow openers.

An additional feature of the present invention is the provision of a planter and fertilizer attachment for each side of the tractor, the planter furrow opener and the fertilizer furrow opener being connected with the tractor for movement relative thereto by means of generally parallel links, the links for the fertilizer opener being separate from the links for the planter furrow opener. In this connection it is also a feature of this invention to provide a new and useful draft arrangement for a fertilizer attachment particularly constructed and arranged to be mounted closely adjacent the planting unit, preferably forward thereof, and driven from the seeding mechanism drive by a simple sprocket and chain connection, the fertilizer furrow opener draft links being disposed alongside but shorter than the draft links for the planter furrow opener thereby accommodating the aforesaid relation between the planting unit and the fertilizer attachment.

An additional feature of the present invention is the provision of spring pressure means associated with the draft links for the planter furrow opener and arranged to be disposed optionally in two different relations, one for the purpose of applying downward pressure to the planter furrow opener associated therewith or for the purpose of holding up the planter furrow opener. Normally downward pressure is desired when the furrow openers or runners operate in hard ground, and when they operate in loose ground, as loosely thrown up beds, it is desirable to apply an upward pressure to the furrow openers or runners to prevent them from operating too deeply. In this connection it is a further feature of the present invention to utilize the spring means connecting the planter and fertilizers furrow openers or runners so that the above mentioned optionally disposable pressure spring means is effective against not only the planter runners but also the fertilizer runners.

These and other objects and advantages of the present invention will be apparent to those skilled in the art after a consideration of the following detailed description of the preferred structural embodiment, taken in conjunction with the accompanying drawings.

In the drawings:

Figure 1 is a side view of a tractor equipped with planting and fertilizer distributing units, constructed and arranged according to the principles of the present invention, the near rear wheel and other parts of the tractor being omitted for purposes of clarity;

Figure 2 is a fragmentary view taken generally along the line 2—2 of Figure 1;

Figure 3 is a fragmentary view taken along the line 3—3 of Figure 1;

Figure 4 is a section taken along the line 4—4 of Figure 1, illustrating in particular the manner of connecting the fertilizer drawbar links to the tractor brackets to which the drawbar links of the planter runners are connected;

Figure 5 illustrates one form of draft or drawbar links for operatively connecting the planter runner with the tractor brackets, the associated spring pressure means being arranged to apply a downward pressure against the planter runner or furrow opener;

Figure 6 is a view similar to Figure 5 but showing the spring pressure means arranged to exert an upward force against the planter runner;

Figure 7 is an enlarged fragmentary perspective, showing the spring pressure bracket arranged to dispose the spring pressure means in the position shown in Figure 5;

Figure 8 shows a modified form of drawbar links for connecting the planter runner with the tractor brackets, and a modified form of spring pressure means;

Figure 9 is a view showing the manner in which the spring pressure bracket is secured to one of the links when the spring pressure means associated therewith is arranged as shown in Figure 8;

Figure 10 is a view similar to Figure 8 but showing the spring pressure means arranged to apply an upward pressure against the planter runner; and Figure 11 is a view showing the manner of attaching the pressure spring bracket to accommodate the disposition of the spring means shown in Figure 10.

Referring now more particularly to Figure 1 the reference numeral 1 indicates a farm tractor of more or less conventional construction so far as the present invention is concerned, the tractor 1 including a frame structure 2 which includes a transmission housing 3, a rear axle housing 4 in which a pair of axle shafts 5 are journaled in laterally extending quill sections (not shown) of the axle housing, and rear traction wheels 6, the near wheel being removed in Figure 1, as mentioned above. The tractor 1 includes a seat 8 forming an operator's station, supported on a standard 9 which is connected to the tractor frame in any suitable manner.

The tractor 1 is arranged to receive a planting unit and a fertilizer attachment at each side, but since the planting unit and fertilizer attachment for one side of the tractor are substantially identical to the planting unit and fertilizer attachment, respectively, for the other side, only one such unit and fertilizer attachment have been shown in detail, the unit and attachment shown being for the right side of the tractor, as will be apparent from Figure 1.

The planting unit is indicated in its entirety by the reference numeral 10 and, being of the integral type, is mounted directly on the tractor. Preferably, the planting unit, as well as the fertilizer attachment referred to below, is like the construction shown in the co-pending application of Charles H. White, Serial No. 311,583, filed December 29, 1939. The unit 10 includes a planter hopper 11 supported on a supporting frame means in the form of a hopper bottom 12. The unit 10 shown in the drawings is particularly adapted for planting corn and cotton seed, and the seed selecting mechanism includes an adjustable gate and a picker wheel fixed to one end of a seeding shaft 16 to which a pinion 17 is fixed. The latter serves to drive a seed plate (not shown) supported for rotation on the hopper bottom 12. The shaft 16 is extended beyond the pinion 17, being supported in suitable bearing sections formed on or carried by the hopper bottom 12, and receives a drive pinion pinned or otherwise fixed to the shaft 16. A suitable drive gear meshes with the drive pinion and is fixed to a seeding shaft 23 by any suitable means. The particular details of the seeding drive do not per se form a part of the present invention, it being understood that any suitable means for driving the seeding shaft 16 may be employed. The planting unit 10 is carried on the tractor rear axle housing by means of a bracket 36 which is fixed to the hopper bottom 12 and to the associated rear axle quill section.

The seeding shaft 23 is driven by a suitable connection to the axle shaft at that side of the tractor. To this end, a double sprocket gear member is mounted rotatably on the laterally outer end of the seeding shaft 23, and a double driving sprocket member 44 is fixed to the axle shaft 5. A driving sprocket chain 46 is trained over the sprocket gear member 44, and over the associated sprocket gear section of the driven sprocket gear member on the shaft 23. Suitable clutch mechanism, indicated by the reference numeral 48, controlled by a shiftable clutch fork 55, operatively connects the shaft 23 and the sprocket gear member that is driven from the axle shaft 5 by the sprocket chain 46. As will be understood, disengaging the clutch 48 interrupts the drive from the axle shaft 5 to the seeding shaft 23.

A furrow opener unit is indicated in Figure 1 by the reference numeral 70 and is disposed in a position substantially directly underneath the lateral extension of the rear axle housing 4 and the hopper 11. The hopper bottom 12 is formed to receive a funnel-shaped spout top 71 which directs the seed selected into a longitudinally extensible seed tube 72 which at its lower end leads into the shank 73 of the furrow opener unit 70. The latter unit includes a furrow opening runner 75 to which a pair of opener frame members 76 are fixed by any suitable means, each opener frame including upwardly extending apertured sections 77. A press wheel frame 80, comprising a pair of bars 81 welded together at their rear ends and spaced apart and apertured at their forward ends, is bolted, as at 82, to the opposite sides of the furrow opener unit 70 and at its rear end rotatably receives a pair of press wheels 83 of usual construction. A pair of knife coverers 85 are resiliently connected to the press frame bars 81 in the usual way. Since each furrow opener unit 70 is floatingly connected, as will be explained below, with the tractor, each runner 75 is provided with right and left hand gauge shoes 88 and 89 (Figures 1 and 2) which are connected by braces 90 to the runner frame members 76. Where necessary, gauge shoe sweeps 92 are fixed on opposite sides of the runner 75.

Suitable connections extend between each furrow opener unit 70 and the tractor and permit each furrow opener to have vertical movement relative to the tractor, this being permitted since the seed tube or spout 72 is formed of flexible ribbon which does not interfere with the movement of the furrow opener 70 relative to the spout top 71 which is carried in fixed relation on the tractor, being connected to the hopper bottom 12 which is mounted on the bracket 36, as described above. The means connecting each furrow opener unit 70 with the tractor includes a pair of generally parallel drawbar links 101 and 102, best shown in Figures 5 and 6. Tubular sleeves 103 and 104 are welded to opposite ends of the upper drawbar link 101, and similar tubular sleeves 105 (Figure 7) and 106 are welded to the ends of the lower link 102. At their rear ends the tubular sleeve sections 104 and 106 of the drawbar links 101 and 102 receive pivot bolts 110 and 111, the bolts 110 and 111 being disposed in suitable apertures formed in the runner frame extensions 77. At the forward ends of the links 101 and 102 the tubular sleeve sections 103 and 105 receive pivot bolts 113 and 114 which are carried by a pair of tractor drawbar brackets 116 and 117, each consisting of a pair of spaced and apertured plates offset at their upper ends and receiving therebetween a clamp casting 120 in apertures in which a U-bolt 121 is received. The U-bolts 121 serve to fix the tractor brackets 116 and 117 to a laterally extending draft frame or drawbar 124 which is fixed to the side of the tractor frame 2 in any suitable manner. A brace 126 (Figure 1) is bolted, as at 127, to a bar 128 which is welded or otherwise permanently fixed to the outer end of the draft bar 124, and at its rear lower section 37 of the planter supporting bracket 35, as best shown in Figure 1. If desired, the two bars 126 and 128 may be formed of one piece, in which case the bolts 127 will be eliminated.

As mentioned above, by virtue of the parallel linkage 101, 102, the furrow opener units 70 are floatingly connected with the tractor 1. When operating in hard ground it may be that the weight of the runner units 70 is not sufficient to cause the same to penetrate to the desired depth. To provide for this condition, a pressure spring 134 is connected to a pressure spring hook 135 which encircles the upper rear tubular link section 104. At its forward end the spring 134 is adjustably connected to an adjusting bolt 136, the rear end of which is threaded into a nut member 137 that is fastened to the forward end of the spring 134. The forward end of the adjusting bolt 136 is provided with an eye 138 which bears against a spring pressure bracket 139 connected by a bolt 140 to the inside tractor bracket 117. As best shown in Figures 5 and 7, the bolt 140 is disposed in an aperture in the bracket 117 above the bolt 114 which receives the forward end of the link 102, so that the tension in the spring 134 pulls the bracket 139 back against the tubular section 105 of the link 102, thereby securely anchoring the forward end of the spring 134. As will be understood, the tension in the spring 134 exerts a downward pull or component of force against the rear end of the upper link 101, tending to press the associated furrow opener unit 70 into the ground until the gauge shoes 88 ride along the surface of the ground.

Under other conditions of operation, as when planting in loosely thrown up beds, it may be desirable to exert a force tending to hold up the furrow openers or runners to prevent them from operating too deeply. If such is the case, the spring 134 and associated parts are arranged as shown in Figure 6; that is, the pressure spring hook 135 is engaged over the lower sleeve section 106 of the lower link 102 and the bracket 139 is mounted in a position to bear against the forward end of the upper link 101, by removing the bolt 140 from its lower position (Figure 5), inserting the same in an opening 142 in the inside tractor bracket 117. The opening in the latter for receiving the bolt 140 in the position shown in Figure 5 is indicated at 143 in Figure 6. It is therefore a matter of only a moment's time to place the spring 134 in either of its optional positions to accommodate the planting unit of the conditions present.

A modified form of link means connecting the furrow openers 70 with the tractor is shown in Figures 8 to 11. In these figures the tractor brackets 116 and 117 and the runner frame extensions 77 are the same as described above. Hence, the same reference numerals have been applied. In this form of the invention the upper and lower links are indicated by the reference numerals 101a and 102a, each link being formed of a pair of straps 151 and 152. The former preferably is straight from end to end while the latter is offset outwardly, as indicated at 153 and 154. The straps 151 and 152 are permanently and rigidly fastened together by short connecting bars 156 and 157 which are welded at their opposite ends to the strap members 151 and 152 adjacent their ends. Thus, I provide link means of light weight but strong and sturdy construction, and the ends of the straps 151 and 152, which are apertured, are spaced apart laterally a distance sufficient to provide exceptional lateral rigidity. The apertured ends just mentioned receive the pivot bolts 110, 111, 113 and 114 (see Figures 1 and 5) by which the links are pivotally connected to the runner frame 76 and the tractor supported draft brackets 116 and 117. Pivot bushings (not shown) may be mounted on the pivot bolts 110, 111, 113 and 114 to receive the links 101, 102, 101a and 102a, if desired.

The link means 101a and 102a, like the link means 101 and 102 described above, are provided with spring means disposed optionally in two positions so as to exert either a downward pressure or an upward pressure effective against the runner frames 76 to accommodate different operating conditions. In Figures 8 and 10, the spring means, indicated in its entirety by the reference numeral 160, is slightly different from the spring means 134 described above, although in general the effect is approximately the same. Referring now to Figures 8 and 9, like the springs 134, the springs 161 are tension springs, so that when arranged as shown in Figures 8 and 9, the spring means apply downward pressure to the runners to hold them in hard ground. Each spring 161 is provided with a hook end 162 (Figure 8) which in this arrangement is engaged around the lower bracket pivot bolt 114 or the bushing carried thereby. The upper end of the spring 161 is threadedly connected by a nut member 164 to a bolt member 165, the head 166 of which is engaged in an apertured end 167 of a bracket 168 (Figure 9). The bracket 168 is of particular construction. The main body portion of the bracket 168 is indicated at 169, the end 167 being bent almost at right angles to the section 169 while the other end section 171 is bent at about 45 degrees. Each of the bracket sections 167, 169 and 171 is apertured, the section 171 having two apertures, one of which is shown at 173 in Figure 9. When the spring means 160 is arranged as shown in Figures 8 and 9, the end section 171 is secured, as by a bolt 172, to the connecting bar 157 between the strap members 151 and 152 of the upper link 101a. This disposes the end 167 in a position to receive the upper end of the spring pressure adjusting bolt 165.

When the runners or furrow openers 70 tend to penetrate too deeply, as when planting in loose soil, or for any other reason, the spring means 160 are arranged as shown in Figures 10 and 11. In this position, the intermediate section 169 of the spring pressure bracket 168 is bolted to the bar 157 of the lower link 102a, the spring pressure adjusting bolt being placed in the outer opening 173 (see Figure 9) of the bracket section 171. The opening in this section which receives the clamping bolt 172 when the bracket is arranged as in Figure 9 is indicated by the reference numeral 174 in Figure 11. The upper end of the spring 161 is connected to the upper pivot bolt 113 by having the hook end 162 of the spring 161 engaged around it. As will be clear from Figure 10, when the spring 160 is arranged in this manner, it exerts an upward force tending to lift the associated runner 70 out of the ground.

The structure so far described comprises a planting implement, there being one of the units 10, 70, with associated parts at each side of the tractor. The hopper and seed selecting mechanism is supported firmly on the tractor, directly on the rear axle housing 4, and the furrow openers 70 are floatingly connected to the tractor carried frame 124 and brackets 116 and 117 by the generally parallel links 101, 102 or 101a, 102a.

It is frequently desirable to provide a fertilizer attachment for operative association with a planting implement, such as the one described above. Referring now more particularly to Figure 1, I have shown a fertilizer attachment indicated in its entirety by the reference numeral 200. The fertilizer attachment 200 consists of a hopper and fertilizer distributing unit 201 and a fertilizer furrow opener unit 202, together with associated connections. The fertilizer hopper 204 is carried on a hopper frame or hopper bottom 205 and is provided with a pair of attaching arms 206. The present invention is not concerned with the particular details per set of the fertilizer attachment or the drive therefor, such being disclosed and claimed in the co-pending application of Charles H. White, identified above, and hence only a brief description of this portion of the fertilizer attachment will be necessary. The present invention is concerned, however, with new and improved connections for the fertilizer attachment runner, connecting the latter with the tractor and with the planter runner, as will be explained below.

As more clearly shown in the above-mentioned copending application, the arms 206 of the fertilizer hopper bottom are adapted to embrace and be connected with the casing or its associated parts which encloses the drive gearing between the seeding shaft 23 and the seed plate driving shaft 16. In addition, a brace member 212 extends downwardly from the fertilizer hopper bottom 205 to the longitudinally extending brace 126, being bolted at its lower end, as at 213, to the brace 126. At its upper end the brace member 212 is bent laterally and is bolted or otherwise secured to the fertilizer frame or fertilizer hopper bottom 205. To this end, the hopper bottom 205 is provided with one or more bosses 214.

The fertilizer hopper 204 is adapted to contain fertilizer which is distributed by suitable agitating means indicated in dotted lines by the reference numeral 220 in Figure 1. The particular details of the agitating means 220 do not per se form a part of the present invention, and hence extended description is unnecessary. It will be sufficient to note that an upper agitator 221 is mounted eccentrically upon a lower agitator 222, the latter being fixed to the upper end of a vertical shaft 223 which is mounted for rotation in a vertical boss 225 depending from the fertilizer hopper bottom 205.

The fertilizer distributing or agitating means is driven through mechanism which is brought into operative association with the driving gear 22 of the seeding mechanism when the hopper unit 201 is brought into position and held in place by the arms 206 and 207 and the brace 212. This driving mechanism is disclosed in detail and claimed in the above-mentioned co-pending application. For the purposes of the present disclosure, it is sufficient to note that the lower end of the shaft 223 receives a sprocket gear about which a driving sprocket chain 239 is trained. The latter is driven from the driving bevel gear on the seeding shaft that drives the seed plate shaft 16, as is clearly disclosed in the above-mentioned co-pending application.

The fertilizer hopper bottom 205 is provided with a fertilizer spout section 265 and a fertilizer tube 266 of the flexible ribbon type is connected at its upper end to the spout section 265 and at its lower end to a fertilizer opener shank 267 which forms a part of the fertilizer opener unit 202 (Figure 1). The runner of the fertilizer opener unit is indicated at 268. A fertilizer opener frame member 270 of welded construction, embodying a generally vertical member 271 and a horizontal rearwardly extending member 272, is bolted, as at 273 and 274, to the opener shank 267 and the forward end of the runner 268 so as to form a part of the fertilizer furrow opener 202. The vertical section 271 is apertured to receive a pair of pivot bolts 276 and 277 by which upper and lower link members 278 and 279 are connected to the fertilizer furrow opener 202. Each of the link members 278 and 279, as best shown in Figure 2, comprises a pair of strap members 281 and 282, the forward ends of which are disposed on opposite sides of the outer tractor supported draft bracket 116. The forward ends of the straps 281 and 282 of both links 278 and 279 are apertured so as to receive and be pivotally connected to the bracket 116 by the pivot bolts 113 and 114 which, respectively, pivotally connect the planter furrow opener link members 101 and 102 to the tractor. By pivotally connecting the fertilizer furrow opener links 278 and 279 to the same pivots to which the planter furrow opener links 101 and 102 are connected, a simple construction is provided. Further, it materially facilitates both the planter and fertilizer furrow openers 70 and 202 moving vertically together more or less as a unit relative to the tractor, since they are pivotally connected therewith at the same points. Still further, the pivotal association of the fertilizer furrow opener links 278 and 279 with the outer tractor draft bracket 116 effectively disposes the fertilizer furrow opener 202 in the desired position relative to the planter furrow opener 70, namely, forward of and laterally outwardly of the planter runner 75. Thus, the fertilizer is deposited adjacent the seed receiving furrow but spaced therefrom so that there is no possibility of the fertilizer coming into direct contact with the seed.

As best shown in Figures 1, 2 and 3, spring means 285 is connected between the planter furrow opener 70 and the fertilizer furrow opener 202 for yieldingly holding the latter in position by the former, whereby the biasing spring means, 134 or 160, associated with the planter furrow opener may be effective also against the fertilizer furrow opener associated therewith. The spring means 285 includes an eye bolt member 286 adapted to be fixed to the outer of the planter runner frames 76, to which end the vertical extension 77 thereof is provided with one or more openings 287 (Figure 1). Slidably mounted in the eye bolt member 286 is a rod member 288, the upper end of which extends through the eye of the member 286, while the lower end is bent laterally, as indicated at 289, and is extended through the aperture in a lug 291 which is secured to or formed as a part of the fertilizer opener shank 267. A spring 292 embraces the upper end of the rod member 288 and and at its upper end bears against the eye bolt member 286 and at its lower end bears against a collar 293 welded or otherwise fixed to the rod 288. A pin or cotter key 294 is carried at the upper end of the rod member 288, as best shown in Figure 3, so that the downward movement of the rod member 288 relative to the fixed member 286 is limited, and hence the effect of the spring 292 in urging the fertilizer furrow opener 202 downwardly relative to a planter fertilizer opener 70 is likewise limited. As will be readily understood, yielding of the spring 292 permits the fertilizer furrow opener 202 to move upwardly relative to the planter fertilizer opener 70, as when an obstruction is encountered, yet in so doing the fertilizer furrow opener 202 exerts a force through the spring 292 tending to lift the planter furrow opener 70 also away from such obstruction. The object in providing more than one opening 287 (Figure 1) to receive the eye bolt member 286 is to provide for placing the fertilizer at different depths relative to the planter furrow opener 70. When it is desired to place the fertilizer relatively deep, the member 286 is fixed in the lower hole 287, as shown in Figure 1, and when it is desired to place the fertilizer shallower, the eye bolt member 288 is fastened in the upper hole. As will be apparent, the bent end 289 may be disposed in one or the other of the openings 287 and the eye bolt member 286 may be attached to the lug 291 on the fertilizer opener shank 267. A connection between the furrow openers 70 and 202 established by the spring means 285 just described also makes it possible to raise both furrow openers through a single means, preferably the means ordinarily supplied for the planter unit alone. The lifting means will now be described.

A hand lever 301 (Figure 1) is pivotally mounted, as at 302, on the planter supporting bracket 35 and has a forwardly extending portion 303 which is connected by a chain 304 to the furrow opener runner frame 76. The lever 301 is provided with suitable detent mechanism, not shown, and as will be clear from Figure 1, swinging the lever 301 rearwardly about the pivot 302 raises the forward end 303 upwardly, thereby raising the planter furrow opener 70. The upward movement of the latter acts through the interconnecting spring means 285 to also raise the fertilizer furrow opener unit 202. According to my invention, the movement of the hand lever 301 is made use of for automatically disconnecting the drive from the axle shaft 5 to the seeding shaft 23. To this end, the forward portion 303 of the hand lever 301 carries a cam 306 which is so shaped and angled laterally so as to engage and shift the inner end of the clutch fork 55, so that when the hand lever 301 is moved rearwardly, the clutch fork 55 is automatically shifted laterally outwardly thereby disconnecting the clutch 48 and interrupting the drive from the axle shaft 5 to the seeding shaft 23. As will be understood, this stops the operation of both the planting mechanism and the fertilizer mechanism since the latter is connected to the former and driven thereby from the seeding shaft 23 as described above.

The operation of the structure described above is believed to be apparent. Briefly, the planting unit 10 is fastened in place directly on the tractor axle housing by the mounting bracket 36, and the planter furrow opener unit 70 is floatingly connected with the tractor through the generally parallel link means 101 and 102. The seed selecting mechanism of the planting unit is driven from the drive shaft gear 44 by means of the sprocket chain 46 which, under the control of the clutch means 48, serves to drive the seeding shaft 23. The gear 22 fixed to the latter then drives the shaft 16 which, in turn, drives the seed plate and/or the picker wheel. The furrow opener unit 70 may be raised and lowered by the hand lever 301 which automatically engages and disengages the clutch 48, when the cam section 306 on the forward arm 303 of the hand lever 301 engages the inner end of the shift fork 55. When it is desired to apply pressure to force the furrow opener units 70 into the ground with a force that is greater than their own weight, the springs 134 are arranged as indicated in Figures 1 and 5, and when it is desired to apply a lifting force to the furrow openers 70 to reduce their tendency to penetrate into soft or loose soil, the springs are arranged as indicated in Figure 6. If spring means of the form shown in Figures 8 and 10 are employed, for increased pressure, the springs 160 are arranged as in Figure 8 and for decreased pressure they are arranged as in Figure 10.

When the fertilizer attachment is to be used, the fertilizer attachment driving connections are brought into operative relation and the brace 212 fastened in position. The latter is supported by the longitudinal brace 126 which serves, in addition, to reenforce the tractor draft frame means 124 when the fertilizer furrow openers 202 are link-connected thereto. By connecting the fertilizer draft links 278 and 279 to the outer tractor bracket 116, the fertilizer opener 202 associated therewith is disposed in the proper position, laterally and forwardly, relative to the planter furrow opener, and when the latter is raised the spring units 285 also raise the furrow opener units 202 associated therewith.

While I have shown and described above the preferred structure in which the principles of the present invention have been embodied, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural implement comprising a frame, planting mechanism including a furrow opener movably connected with said frame, a fertilizer attachment including a fertilizer furrow opener disposed adjacent said first furrow opener, means connecting said fertilizer furrow opener with said frame for movement relative to said first furrow opener, and means acting between said furrow openers for opposing movement of one relative to the other, whereby the position of one furrow opener serves to control the position of the other.

2. An agricultural implement comprising a frame, planting mechanism including a furrow opener movably connected with said frame, a fertilizer attachment including a fertilizer furrow opener disposed adjacent said first furrow opener, means connecting said fertilizer furrow opener with said frame for movement independent of said first furrow opener, and spring means connecting said two furrow openers, said spring means reacting against said planting mechanism furrow opener to hold the fertilizer furrow opener down in working position.

3. An agricultural implement comprising a frame, planting mechanism including a furrow opener movably connected with said frame, a fertilizer attachment including a fertilizer furrow opener disposed adjacent said first furrow opener, link means pivotally connected at the forward end to said frame and extending generally rearwardly and connected to said fertilizer furrow opener, spring means acting against one of said furrow openers for yieldingly holding the same in one position, and a connection between said one furrow opener and the other furrow opener, whereby said spring means acts to hold said other furrow opener in position.

4. An agricultural implement comprising a frame, planting mechanism including a furrow opener, generally vertically disposed bracket means carried by said frame, a pair of generally parallel draft links pivotally connected at their rear ends to said furrow opener, pivot means connecting the forward ends of said draft links to said bracket, a fertilizer furrow opener disposed adjacent said first furrow opener, and a pair of generally parallel draft links pivotally connected at their rear ends to said fertilizer furrow opener and at their forward ends to the pivot means on said fame-carried bracket.

5. An agricultural implement comprising a supporting frame, planting mechanism including a furrow opener, means comprising a pair of generally parallel links pivotally connected at their forward ends to said frame and at their rearward ends to said furrow opener for floatingly connecting the latter with said frame, a fertilizer attachment including a fertilizer furrow opener disposed adjacent said first furrow opener, means floatingly connecting said fertilizer furrow opener with said frame, spring means connected between said furrow openers, and a second spring means optionally connectible to said planting mechanism furrow opener and said frame in two different positions, one for pressing the planting mechanism furrow opener downwardly and the other for applying a force holding the same upwardly, said second spring means acting through said first spring means against the fertilizer furrow opener for pressing the same downwardly or urging the same upwardly corresponding to the force exerted against the planting mechanism furrow opener.

6. An agricultural implement comprising a supporting frame, a furrow opener movable relative to said frame, draft transmitting means movably connecting said furrow opener with said frame, including a pair of parallel drawbar links disposed in generally vertically spaced relation, upper and lower pivot means pivotally connecting the forward ends of said links with said frame, upper and lower pivot means pivotally connecting the rear ends of said links with said furrow opener, each of said links having spring-receiving means, and means for optionally applying an upward or a downward force against said furrow opener, comprising a spring member and means optionally connecting said spring member with the spring-receiving means on one or the other of said drawbar links for applying an upward or a downward pressure to said furrow opener.

7. An agricultural implement as defined in claim 6, further characterized by said last mentioned means including a detachable part adapted to be connected to the spring-receiving means on either one or the other of said drawbar links.

8. An agricultural implement comprising a supporting frame, planting mechanism including a furrow opener, a pair of attaching brackets fixed to said frame in laterally spaced relation, a pair of generally vertically disposed links pivotally connected at one end to said furrow opener and disposed at their other ends between said laterally spaced brackets, pivot means connecting said other ends of the links with said brackets, an attachment including a second furrow opener disposed adjacent said first furrow opener, a pair of links pivotally connected at one end to said second furrow opener, each of the links of said second pair comprising a pair of strap members, one disposed on the inside and the other on the outside of one of said brackets, said strap members being apertured to receive the pivot means connecting said first mentioned links with said brackets.

9. An agricultural implement comprising the combination of a tractor having a driving axle and a housing enclosing the same, a seed selecting unit disposed generally above said axle housing, said seed selecting unit including a first furrow opener disposed generally underneath said axle housing, a pair of relatively long draft links disposed generally in parallelism and pivotally connected at their rear ends to said first furrow opener, end means connecting the forward ends of said links with the tractor, whereby said first furrow opener may move vertically relative to the tractor and the seed selecting unit, a fertilizer attachment including a second furrow opener disposed forward of said first furrow opener, and a pair of links disposed generally in parallelism alongside said draft links and pivotally connected at their rear ends with said second furrow opener, said second pair of links being shorter than said first pair to accommodate the forward position of said second furrow opener relative to said first furrow opener, means connecting said furrow openers whereby when one is lifted into transport position both furrow openers are raised out of engagement with the ground, and means for lifting said one furrow opener into transport position.

10. The combination set forth in claim 9, further characterized by said connecting means including a one-way connection whereby the other furrow opener is capable of moving upwardly relative to said one furrow opener.

11. The combination with a planter having a vertically movable furrow opener, of a fertilizer attachment having a vertically movable furrow opener, and link means for movably connecting said fertilizer furrow opener with the planter furrow opener for limiting the movement of one relative to the other.

12. The combination with a tractor planter adapted to be connected to a tractor having a laterally extending part and including means fixing the planter to the tractor at a point spaced from said part, a planter furrow opener, and means including a pair of generally parallel links connecting said planter furrow opener with said laterally extending part on the tractor for movement relative to the latter, of a fertilizer attachment, means for supporting the fertilizer attachment on the tractor, a fertilizer furrow opener, and means including a separate pair of generally parallel links for connecting said fertilizer furrow opener with said laterally extending part of the tractor.

13. In a planter, frame means, a pair of seed and fertilizer furrow opening elements separately connected with said frame means, means connected with one of said elements for raising it into inoperative position, and a connection extending from said one element to the other whereby both elements may be raised by said one raising means.

14. In a planter, frame means, a pair of relatively movable furrow opening elements separately connected with said frame means for movement into and out of operative and inoperative positions, means connected with one of said elements for urging the same toward one of its positions, and a connection extending from said one element to the other whereby both elements are urged toward said position by said urging means.

15. In a planter, frame means, a pair of relatively movable furrow opening elements separately connected with said frame means for movement into and out of furrow opening positions, spring means for urging one element toward a furrow opening position, a connection extending from said one element to the other whereby said spring means acts to urge both of said elements in said one direction, and means for raising said one element, said connection serving to cause both of said elements to be raised by said one raising means.

16. In a planter, frame means, a pair of relatively movable furrow opening elements connected with said frame means for movement into and out of different positions, means connected with one element for moving it into one of its positions, and means reacting against said one element for holding the other element in one of its positions.

17. An agricultural implement comprising a frame, planting mechanism including a furrow opener movably connected with said frame, a fertilizer attachment including a fertilizer furrow opener disposed adjacent said first furrow opener, means connecting said fertilizer furrow opener with said frame for movement independent of said first furrow opener, spring means connecting said two furrow openers, said spring means reacting against said planting mechanism furrow opener to hold the fertilizer furrow opener down in working position, and means for raising said planting furrow opener out of working position, said means acting through said spring means for also raising said fertilizer furrow opener.

18. An agricultural implement comprising a supporting frame, planting mechanism including a furrow opener, means comprising a pair of generally parallel links pivotally connected at their forward ends to said frame and at their rearward ends to said furrow opener for floatingly connecting the latter with said frame, a fertilizer attachment including a fertilizer furrow opener disposed adjacent said first furrow opener, means floatingly connecting said fertilizer furrow opener with said frame, spring means connected between said furrow openers, and a second spring means connected with said frame and said planting mechanism furrow opener for applying a force to the latter generally in one direction, said second spring means acting through said first spring means against the fertilizer furrow opener for pressing the latter generally in said direction.

19. An agricultural implement comprising a frame, planting mechanism including a furrow opener, a pair of generally parallel draft links pivotally connected at their rear ends to said furrow opener, pivot means connecting the forward ends of said draft links to said frame, a fertilizer furrow opener disposed adjacent said first furrow opener, and a pair of generally parallel draft links pivotally connected at their rear ends to said fertilizer furrow opener and at their forward ends to said frame.

20. An agricultural implement comprising a supporting frame, planting mechanism including a furrow opener, means floatingly connecting the planter furrow opener with said frame, a fertilizer attachment including a fertilizer furrow opener disposed adjacent said first furrow opener, means floatingly connecting said fertilizer furrow opener with said frame, spring means connected between said furrow openers, and a second spring means including a bracket attachable to said planting mechanism furrow opener and said frame in two different positions, one for pressing the planting mechanism furrow opener downwardly and the other for applying a force holding the same upwardly, said second spring means acting through said first spring means against the fertilizer furrow opener for pressing the same downwardly or urging the same upwardly corresponding to the force exerted against the planting mechanism furrow opener.

21. In an agricultural implement, a support, tool means, a pair of generally parallel links, pivot means connecting said links to said tool means and said support, each link having a spring-receiving section, and a spring disposable in two optional positions, one to the spring-receiving section of one link and the adjacent pivot of the other link and the other to the spring-receiving section of said other link and the adjacent pivot of said one link, whereby said spring urges said tool means downwardly or upwardly.

22. In an agricultural implement, a support, tool means, a pair of generally parallel links, pivot means connecting said links to said tool means and said support, each link having a spring-receiving section, and a spring disposable in two optional positions, one to the spring receiving section of one link and the other to the spring-receiving section of said other link, whereby said spring urges said tool means downwardly or upwardly.

23. In an agricultural implement, a support, tool means, a pair of generally parallel links, pivot means connecting said links to said tool means and said support, each link having a spring-receiving section, a spring disposable in two optional positions, one to the spring-receiving section of one link and the other to the spring-receiving section of said other link, and a bracket receiving the other end of said spring and connectible with said support at two different positions, whereby said spring urges said tool means downwardly or upwardly.

24. An agricultural implement comprising the combination with a tractor, of a transverse draft bar fixed to the tractor, fertilizer distributing mechanism including a fertilizer container and feeding means carried by the tractor, a fertilizer furrow opener receiving fertilizer from said feeding means, a seed container and seed selecting means carried by the tractor, a seed furrow opener connected with said draft bar generally rearwardly of said fertilizer furrow opener, and means connected with the seed furrow opener for holding the fertilizer furrow opener down in working position.

25. An agricultural machine comprising supporting means, seed and fertilizer furrow openers connected with said supporting means for relatively free vertical movement with the seed furrow opener in rear of the fertilizer furrow opener, a generally forwardly extending part on the seed furrow opener, and means acting between said part and the fertilizer furrow opener for limiting the movement of one furrow opener relative to the other.

26. An agricultural machine comprising supporting means, seed and fertilizer furrow openers connected with said supporting means for relatively free vertical movement with the seed furrow opener in rear of the fertilizer furrow opener, a generally rearwardly extending part on the fertilizer furrow opener, and means acting between said part and the seed furrow opener for limiting the movement of one furrow opener relative to the other.

27. An agricultural implement comprising a frame, planting mechanism including a furrow opener, two pairs of generally laterally spaced apart links connecting said planter furrow opener with said frame, a fertilizer attachment including a fertilizer furrow opener disposed adjacent said first furrow opener, a rod pivoted to one of said furrow openers and extending toward the other, a member carried by said other furrow opener and slidably receiving said rod, and a spring disposed about said rod and reacting at one end against the latter and at the other end against said member for applying a yielding downward pressure against said fertilizer furrow opener.

28. An agricultural implement comprising a frame, planting mechanism including a furrow opener, two pairs of generally laterally spaced apart links connecting said planter furrow opener with said frame, a fertilizer attachment including a fertilizer furrow opener disposed adjacent said first furrow opener, means connecting said fertilizer furrow opener with said frame for movement independent of said first furrow opener, and spring means connecting said two furrow openers, said spring means reacting against said planting mechanism furrow opener to hold the fertilizer furrow opener down in working position.

ORVILLE F. DRENNAN.